United States Patent
Chen et al.

(10) Patent No.: US 7,342,884 B2
(45) Date of Patent: Mar. 11, 2008

(54) METHOD AND APPARATUS FOR ONE DIRECTIONAL COMMUNICATIONS IN BIDIRECTIONAL COMMUNICATIONS CHANNEL

(75) Inventors: LiPing Chen, San Jose, CA (US); David Piehler, Half Moon Bay, CA (US); Adi Bonen, Los Gatos, CA (US); Jumin (Jerry) Liu, Cupertino, CA (US)

(73) Assignee: Harmonic, Inc., Sunnyvale, CA (US)

( * ) Notice: Subject to any disclaimer, the term of this patent is extended or adjusted under 35 U.S.C. 154(b) by 1115 days.

(21) Appl. No.: 10/256,657

(22) Filed: Sep. 26, 2002

(65) Prior Publication Data

US 2003/0214965 A1 Nov. 20, 2003

Related U.S. Application Data

(60) Provisional application No. 60/364,064, filed on Mar. 13, 2002.

(51) Int. Cl.
*H04L 12/00* (2006.01)
(52) U.S. Cl. .................... 370/235; 370/401; 370/296
(58) Field of Classification Search ............ 370/401, 370/235, 286
See application file for complete search history.

(56) References Cited

U.S. PATENT DOCUMENTS

| | | | | |
|---|---|---|---|---|
| 4,599,719 A | * | 7/1986 | Breen et al. ................ | 370/296 |
| 5,541,964 A | * | 7/1996 | Cohen et al. ............... | 375/285 |
| 6,188,494 B1 | * | 2/2001 | Minteer ..................... | 398/135 |
| 6,584,245 B1 | * | 6/2003 | Puzey ......................... | 385/24 |
| 6,643,752 B1 | * | 11/2003 | Donnelly et al. ........... | 711/167 |
| 6,754,210 B1 | * | 6/2004 | Ofek .......................... | 370/389 |

* cited by examiner

*Primary Examiner*—Hassan Kizou
*Assistant Examiner*—Jay P. Patel
(74) *Attorney, Agent, or Firm*—Morrison & Foerster LLP

(57) ABSTRACT

Optical transceivers used in data communications equipment are typically bidirectional and require two-way communications in order to maintain their operability. However, in some applications such as cable television, the traffic is highly unbalanced with very high bandwidth requirements in one direction and minimal bandwidth requirements in the opposite direction. Hence for such efficient and cost effective one-way communication applications, unidirectional fiber optic transceivers are useful. There is provided here a unidirectional transceiver provided internally with a keep-alive signal generator to enable unidirectional transmissions. The keep alive signal is, for instance, idle characters for a Gigabit Ethernet communication system, or any other suitable handshake signal which provides the desired operability.

20 Claims, 5 Drawing Sheets

METHOD AND APPARATUS FOR ONE DIRECTIONAL COMMUNICATIONS IN BIDIRECTIONAL COMMUNICATIONS CHANNEL

CROSS-REFERENCE TO RELATED APPLICATION

This application claims priority to U.S. provisional patent application 60/364,064 filed Mar. 13, 2002.

FIELD OF THE INVENTION

This invention relates to networks and communications and more specifically to one-way communication on a communications network.

BACKGROUND

Networks and network communications are well known. Some networks operate strictly in the electrical regime, that is transmit electrical signals only; other networks use optical signal typically transmitted along optical fiber; other networks are hybrids using both optical fibers and electrical communications such as on coaxial cable. One well known type of network is the Ethernet standard network, typically used for computer-type data communications but not so limited. Ethernet has been expanded to be able to deliver broadband communications such as video and voice. While Ethernet is an electrical communications standard, it is compatible with an optical communications media. Ethernet, like many other computer-based communications systems, is intended for two-way communication such as between computers. Hence the Ethernet standard is for two-way (bidirectional) communications Ethernet compliant hardware (circuitry) normally is designed for communications, that is messages, flowing to and from a particular hub, node, or transceiver. Such Ethernet compliant equipment is widely available and relatively inexpensive. The same is true of other two-way communication standard-compliant equipment.

However there is a requirement, for instance in the cable television industry, for one-way network communications. Typically this is for transmission of programs from the head end to the consumer at his home along the cable television network. Heretofore, such systems did not use Ethernet-compliant equipment but instead used equipment specifically designed for cable television at the head end, hubs, fiber nodes, etc. Especially in the case of communication systems using a hybrid of coaxial cable and optical fibers, provision of two-way communications from the head end to the individual homes is relatively expensive since a separate optical fiber must be used for the downstream transmissions (head end to home) versus the upstream transmissions (home to head end). Therefore in the typical television system application, preferably only one-way communication is provided along the optical fibers. To the extent there is an upstream communication, it frequently uses a different and less expensive communications channel such as, for instance, telephone lines. In the typical cable television system application to the extent there is upstream communication, it typically requires much less information carrying capacity (bandwidth) in the upstream channel than in the downstream channel. For cable-TV, the downstream transmissions are of video (television programs) while the upstream communications are very limited, such as billing information, program selection, or other very low bandwidth communications. In this case, providing a fully bidirectional communications system with equal bandwidth in both directions is economically inefficient. Hence this environment is normally not viewed as one suitable for Ethernet or other bidirectional communications type equipment and such equipment has generally not been used heretofore in such applications.

SUMMARY

This disclosure is directed to a method and apparatus for using conventional bidirectional communications equipment of the type used in the computer networking field, such as Ethernet and other similar network standards compliant equipment, but in such a way that the equipment is used in what is essentially a one-way communications channel. This is of course contrary to the standards which define the compliant equipment. This approach is especially beneficial in the cable television field, as described above. It also allows use of the widely available and relatively expensive hardware which is compatible with Ethernet and similar bidirectional network standards. Examples of such standards are Ethernet, Fast Ethernet, Gigabit Ethernet, Sonet, Fiber-channel, Escon, ISCSI and SDH (a European version of Sonet). This list is not limiting.

Since one-way communications are not compatible with typical two-way communications equipment, a way must be found to adopt that equipment so that it is in fact compatible with one-way communications. Typically the problem is that the transceivers (the devices for transmitting and receiving data) which are compliant with these bidirectional standards are designed to both transmit and receive data periodically. If data is not received periodically passing in both directions, the transceiver is designed to interpret that as a break in the network. This break is regarded as an error condition and results in automatic shutting down the communication port of the transceiver. This is intended to make sure that communications messages are not lost since in the typical bidirectional communications channel, there is constant passage of messages in both directions.

Hence in accordance with this invention since only one-way communication is provided at a particular transceiver, the transceiver is provided with a message generator which periodically generates a "keep alive" message (signal) to the system (e.g., a switch) so that the system (switch) is in fact periodically receiving the expected traffic. This expected traffic is in the form of a fixed message rather than any actual data. Hence in accordance with the invention, the upstream traffic, rather than coming from the user, for instance, is instead provided locally at the transceiver. In other words, a transceiver in accordance with the invention is coupled into the network so that it is receiving downstream video transmissions for passage onto the homes. Since there is no upstream traffic (there being no medium for carrying the upstream traffic from the homes to the head end) instead the message generator is provided at the transceiver coupled to the port of that system (switch) which normally would have been coupled to the upstream channel. This generator periodically generates a simple fixed signal, such as a single digital word, which is interpreted by the, e.g., conventional Ethernet switch as being the expected upstream message traffic.

Hence the switch (communication system) is effectively "fooled" into the condition where it interprets this as being upstream traffic. This satisfies the protocol designed into the system (switch) for two-way traffic and allows the system to remain operating for carriage of the actual downstream traffic. The generator is typically a relatively simple circuit such as serializer with its input terminals tied off to various high and low voltages so as to generate a simple fixed digital word which is applied to the appropriate input port of the transceiver. This generated word is what is referred to in the field as a "legal" signal, that is one which is expected by the transceiver to indicate the presence of traffic on the network. This signal is also referred to in the field as a handshake signal. Hence this relatively simple modification to an otherwise standard bidirectional transceiver provides a transceiver suitable for use in one-way communication channel but using largely standard transceiver circuitry which is commercially available. This results in low cost for a one-way communications channel. Hence this enables use of bidirectional transceivers used in data communications equipment in an essentially one-directional communications network. This approach is suitable for use in systems including fiber optics, but is not so limited. While with conventional bidirectional transceivers the port of the data communications equipment is not enabled if no received signal is present, in accordance with the invention, the transceiver is provided with the handshaking "keep alive" signal to enable unidirectional traffic. The keep alive signal is, for instance, idle characters (for Ethernet), or any other suitable signals for other standards.

DETAILED DESCRIPTION

Figure 1:
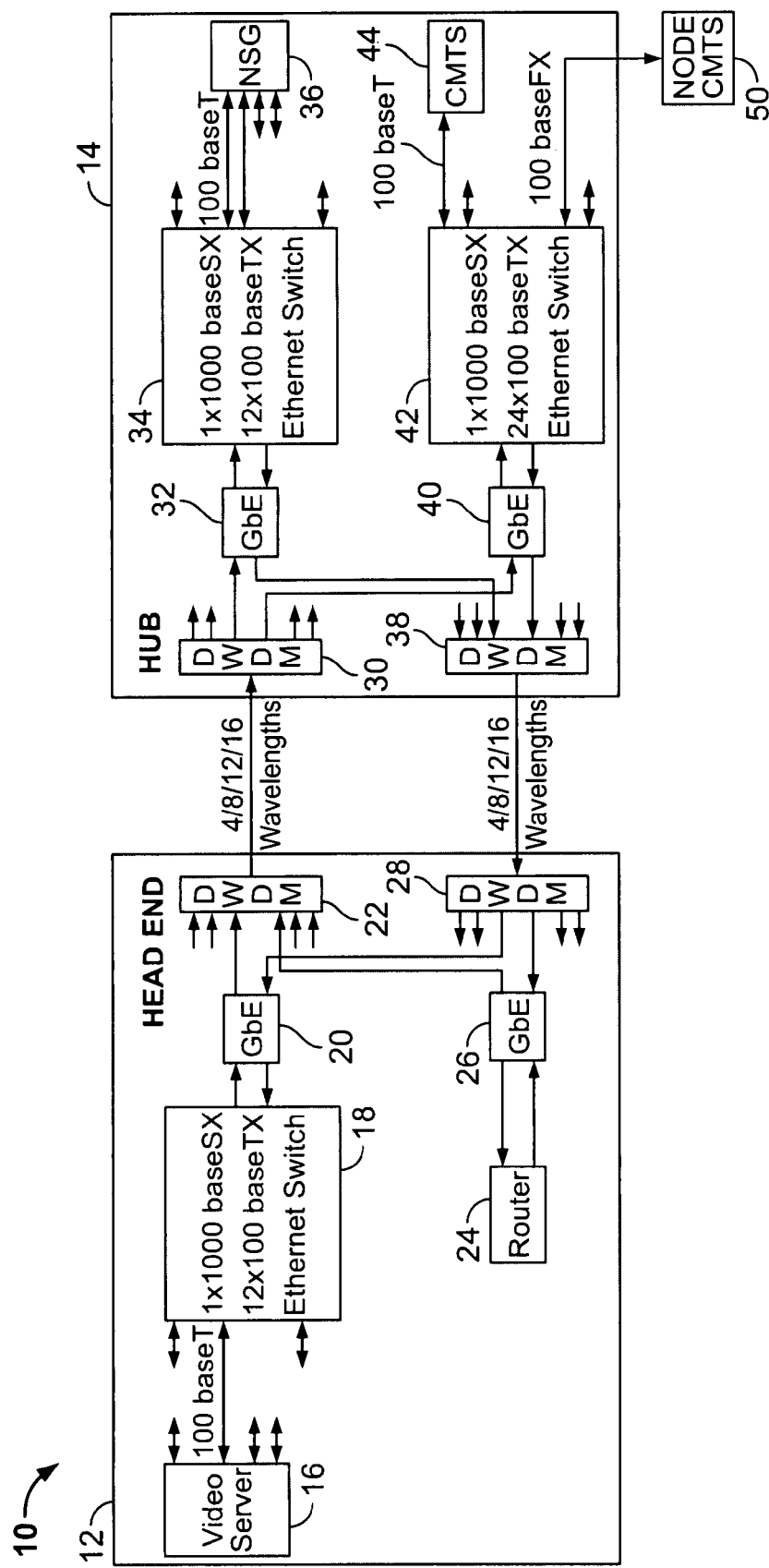
FIG. 1 shows in a block diagram a conventional two-way communications network.

FIG. 1 shows, in the prior art, a block diagram of a hybrid optical/electronic communications network 10. Only relevant portions are shown. The left hand block is the head end 12, for instance the head end of a cable television system which includes a conventional video server 16 connected as shown to an Ethernet switch 18 which in turn is connected to a GBE (Gigabit Ethernet) DWDM transceiver 20 in turn connected to a DWDM (dense wave division multiplexing) (MUX) and demultiplexing (DEMUX) devices 22, 28. DEMUX device 28 drives GBE transceiver 26 coupled to router 24. Conventional hub 14 includes DWDM (MUX and DEMUX) devices 30, 38. Device 30 in turn drives another DWDM transceiver 32 in turn connected to an Ethernet switch 34 which is connected, as shown, to a Narrow-Cast service gateway node (NSG) 36 which performs the function of converting an IP (internet protocol) video stream into QAM format. Various devices, for instance, CMTS (Cable Modem Termination System) 44 which in turn are connected to ultimately the user homes are connected to an Ethernet switch 42. GBE DWDM transceiver 40 and DWDM multiplexer device 38 are for the upstream data transmissions. Hence this is a two-way-network providing transmissions upstream and downstream.

Figure 2:
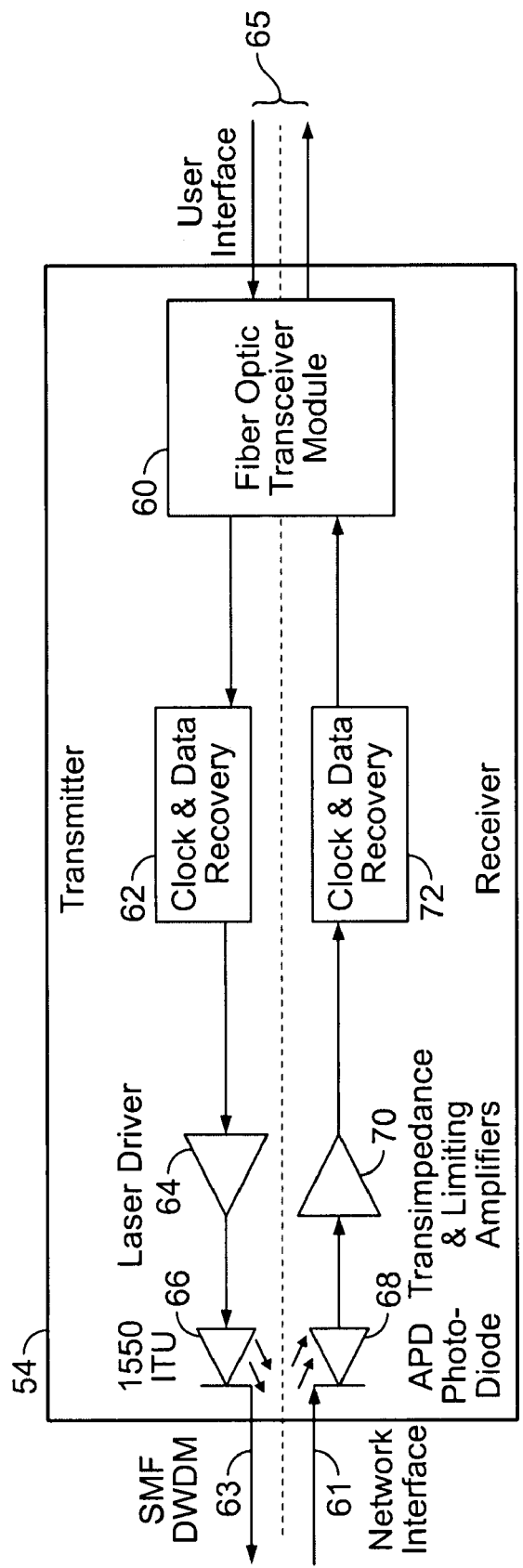
FIG. 2 shows a transceiver for use in the FIG. 1 network.

FIG. 2 shows a transceiver (transmitter/receiver) 54 which in FIG. 1 corresponds to each of transceivers 20, 26, 32, 40. Transceiver 54 includes a conventional fiber-optic transceiver module 60 which performs the function of providing one bidirectional high speed serial data transmission channel over optical fiber or wire interfaces conforming, e.g., to the IEEE 802.3Z Gigabit Ethernet Specification (GBE). Module 60 provides electrical to optical and optical to electrical conversion. On the transmitter side there is associated clock and data recovery circuit 62 which in turn drives laser driver circuit 64 which in turn drives laser driver circuit 64 which in turn drives the ITU (International Telecommunications Union compliant) 1550 nanometer wavelength laser 66 which in turn is connected to a single mode optical fiber (SMF) 63 providing DWDM communication signals on the optical fiber 63. On the receiver side, there is an optical fiber 61 which is in optical communication with a PIN or APD (Avalanche photodiode) 68 which in turn provides electrical signals to transimpedance and limiting amplifier 70 which in turn drives clock recovery circuitry 72 connected to the fiber optic transceiver module 60. This is all conventional. The data communications to and from the optical portions of the system are shown at the right hand portion of FIG. 2 at 65 labeled "user interface".

Figure 3:
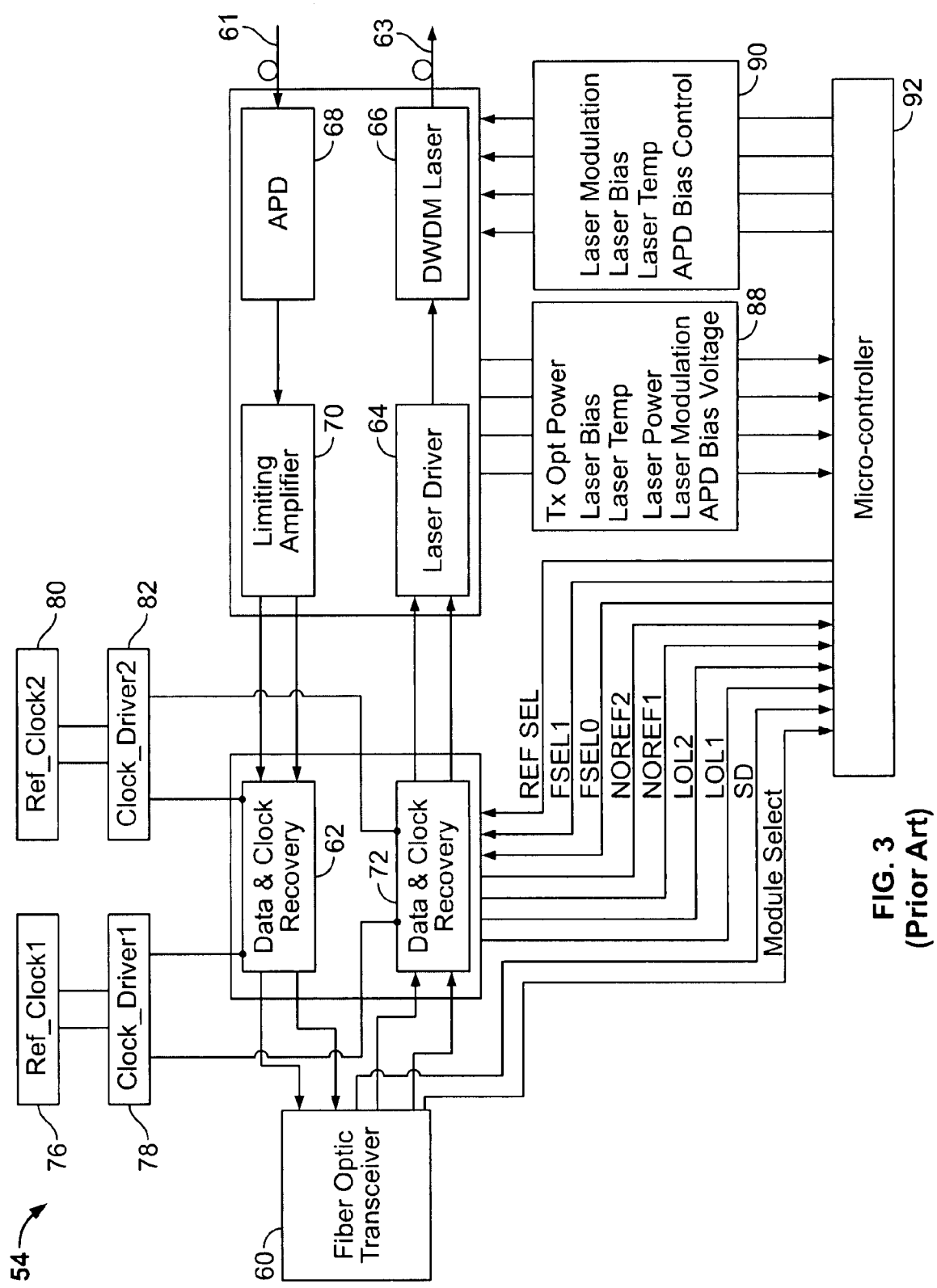
FIG. 3 shows additional detail of the FIG. 2 transceiver.

Further detail of the FIG. 2 transceiver 54 is shown in FIG. 3. Similar blocks from other of the figures are similarly labeled. Further shown in FIG. 3 is the user interface 65 at the right hand side of FIG. 2 to control the fiber optic transceiver module 60 and which includes microcontroller 92, control lines 88 and control lines 90. Also shown for control of the data and clock recovery circuits are reference clock circuits 76 and 80 and clock drivers 78 and 82.

As described above, the FIGS. 1, 2 and 3 system uses conventional components as circuitry in the various Ethernet and GBE switches and in the fiber optic transceiver module 60 which is designed and intended for two-way communications (both transmitting and receiving). Module 60 thereby supports one bidirectional channel; it has one (electrical) data input port and one (electrical) data output port. Module 60 is connected to an Ethernet switch of the type shown as 18 (in FIG. 1). If Ethernet switch 18 does not receive appropriate signals (valid data) from module 60, Ethernet switch 18 will declare a corresponding port failure and hence stops transmitting data downstream to module 60.

Figure 4:
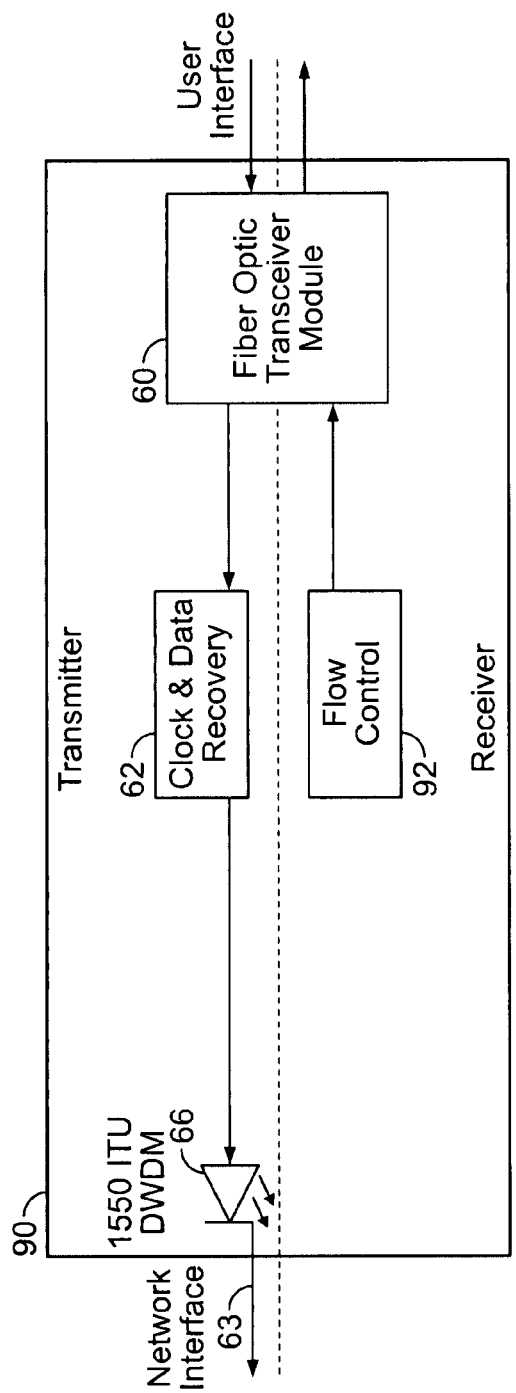
FIG. 4 shows in a block diagram a transceiver in accordance with the invention.

In accordance with the invention, this requirement for two-way (bidirectional) communications by switch 18 is overcome in the one-way communications environment using, instead of transceiver 54, the transmitter 90 of FIG. 4 which partakes of some of the same elements as the transmitter portion of the prior art transceiver 54 of FIG. 2 but omits the receiver portion. Hence this is a transmitter. The same fiber optic transceiver module 60 is used as in the prior art FIG. 2 and FIG. 3 devices. In place of the receiver portion shown in FIG. 2 in transceiver 54, there is flow control circuit 92. Circuit 92 generates the (electrical) "stay alive" signal which is coupled to the electrical data input port of the transceiver module 60. Circuit 92 provides the electrical signal which thereby emulates, e.g., upstream traffic on a two-way network. Flow control circuit 92 (signal generator) is connected to the same (electrical) input port of the fiber optic transceiver module as is the clock and data recovery circuit 72 of FIG. 2. Clearly, however, rather than recovering data from a communication, the circuit 92 merely generates a fixed signal, in one embodiment, which is applied to that port. This effectively causes the fiber optic transceiver module 62 to understand that it is receiving upstream traffic at that port and is to be kept operational for purposes of passing on the downstream traffic as a transmitter. The nomenclature "flow control circuit" 92 is generic; this is a signal generator which in one embodiment provides the predetermined "stay alive" signal as required by the appropriate network protocol. For instance, in the Gigabit Ethernet context this stay alive signal is the following 20-bit digital word: 00111110101001000101.

Figure 5:
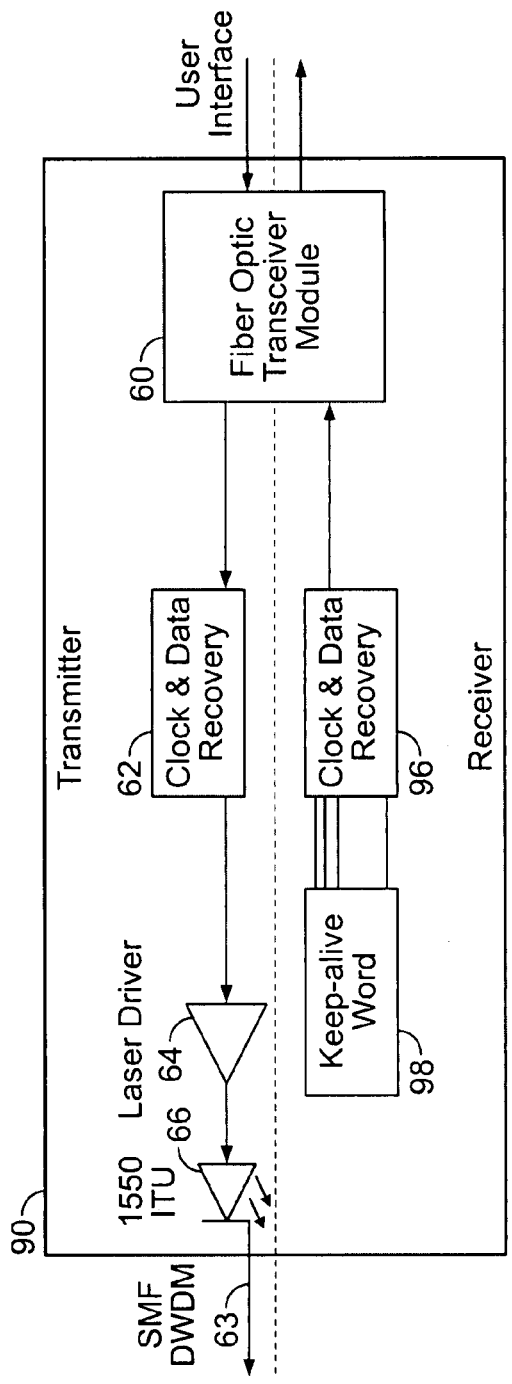
FIG. 5 shows detail of the flow control circuitry of the FIG. 4 transceiver.

In one embodiment the flow control circuit 92, as shown in FIG. 5, includes a conventional 20 to 1 serializer 96 with its 20 input terminals tied off to appropriate high and low (respectively, logic 1 and 0) voltages 98 to define the 20 bit digital keep-alive "word." The serializer 96 outputs this digital word (signal) as a serial signal which is coupled to the (upstream) data input port of module 60. An example of the serializer 96 is AMCC part no. 2046.

Figure 6:
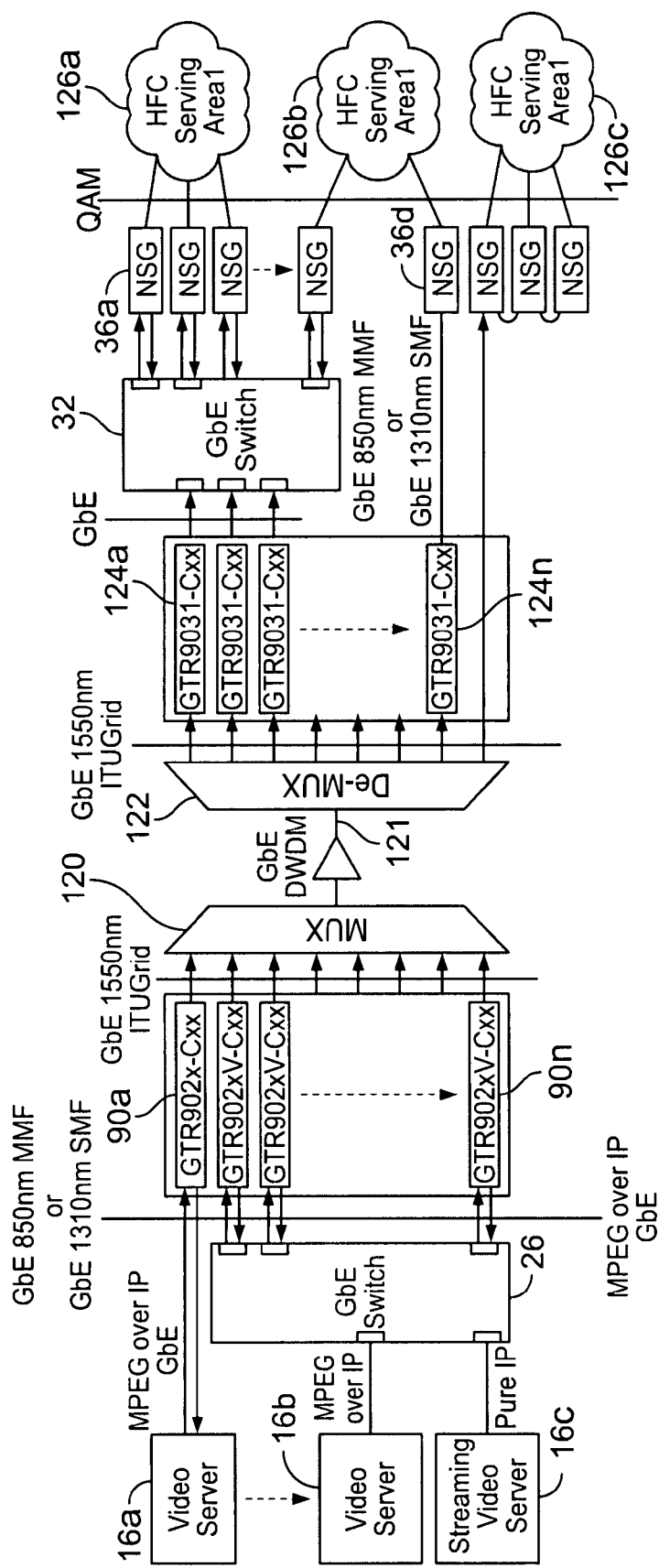
FIG. 6 shows a network including transceivers in accordance with the invention.

FIG. 6 shows a one-way communications network in accordance with the invention using the transceiver (transmitter) 90 of FIG. 4 and corresponds to FIG. 1. Like elements have similar labels as in the previous figures. Several video servers 16a, 16b and 16c are provided in FIG. 6 at the head end. Two of these servers drive the GBE switch 26 which in turn is coupled to, in parallel, a plurality of transmitters 90a-90n. Each transmitter 90a-90n is of the type 90 of FIGS. 4 and 5. Transmitters 90a-90n are multiplexed together by optical multiplexer 120 coupled to the optical fiber 121. The corresponding hub is shown in the right hand portion of FIG. 6 and includes a demultiplexer 122 which in turn drives a number of optical receivers 124a-124n. Each receiver 124 is a conventional wavelength receiver (DWDM receiver) similar to the receiver in the bottom half of FIG. 2. Several of these receivers in turn drive the GBE switch 32. The GBE switch 32 in 10 drives a plurality of gateway node units 36a; gateway node unit 36d is driven directly by receivers 124n. These gateway node units 36a-36d in turn are coupled to a number of hybrid fiber coaxial cable nodes 126a-126c.

Extensions and modifications in accordance with the invention will be evident to those skilled in the art. For instance, a multi-channel one-way time domain multiplexer may be provided. This receives as input signals a number of optical or electrical signals, each applied to a transmitter 90. Each transmitter 90 includes its own flow control circuit as shown in FIG. 4. Each of the optical output signals of these transmitters is then time domain multiplexed together and coupled to an optical fiber. Hence one achieves one-way signal aggregation for a two-way communications protocol in accordance with the invention.

The invention is not limited to the hybrid fiber/coaxial cable environment and not even limited to optical communications but is also suitable for use in purely electrical communications. The invention is also not limited to fiber optical or wired electrical communications but would also apply to free space optical or electrical communications; that is, the invention is independent of the communications medium.

The invention is also not limited to the disclosed one-way communications such as cable TV, but would also apply to highly asymmetric two-way communications, for instance, a cable TV system with a very high bandwidth requirement for downstream communications and a minimal requirement for upstream data communications which is effectively a two-way system but with the two communications channels not being of the same bandwidth and hence not sharing transceivers.

This disclosure is illustrative and not limiting; further modifications will be apparent to those skilled in the art in light of this disclosure and are intended to fall within the scope of the appended claims.

We claim:

1. In a communications channel having a portion requiring bidirectional communications to be operative, a method of providing data communications in a first direction only, comprising the acts of:
    transmitting data on the channel in the first direction; and
    periodically transmitting a predetermined fixed signal on the channel in a second opposing direction thereby to cause the fixed signal to be interpreted as data traffic so as to allow the channel to carry the data communications in the first direction.

2. The method of claim 1, wherein there is no data transmitted other than the predetermined signal in the second direction.

3. The method of claim 1, wherein the communication channel complies with a standard selected from the group consisting of Gigabit Ethernet, Fast Ethernet, Ethernet, Sonet, Fiber channel, ISCSI, ESCON, and SDH.

4. The method of claim 1, further comprising providing a transmitter in the channel and wherein the predetermined signal is generated in the transmitter.

5. The method of claim 1, wherein the predetermined signal is a digital signal one word in length.

6. The method of claim 1, wherein the predetermined signal is a handshake signal.

7. The method of claim 1, wherein the data is video.

8. The method of claim 3, wherein the predetermined signal is a legal signal of the selected standard.

9. transmitter for providing data communication in a first direction only in a bidirectional communications channel, comprising:
    a bidirectional transceiver adapted for transmitting and receiving signals, and having an input port and an output port;
    a clock recovery circuit coupled to receive signals from the output port of the transceiver and propagate signals in the first direction on the communication channel; and
    a signal generator coupled to the input port of the transceiver to periodically transmit a predetermined fixed signal to the input port of the transceiver in a second direction opposite to the first direction, thereby to cause the transceiver to interpret the fixed signal as data traffic so as to allow the transceiver to transmit the data communications in the first direction.

10. The transmitter of claim 9, wherein the signal generator comprises a serializer.

11. The transmitter of claim 9, wherein the transmitter complies with a standard selected from the group consisting of Gigabit, Ethernet, Fast Ethernet, Sonet, Fiber channel, ISCSI, ESCON, and SDH.

12. The transmitter of claim 9, wherein the predetermined signal is a digital signal one word in length.

13. The transmitter of claim 9, wherein the predetermined signal is a handshake signal.

14. The transmitter of claim 11, wherein the predetermined signal is a legal signal of the selected standard.

15. A communications system adapted for data communications in a first direction only, comprising:
    a medium;
    a transmitter coupled to the medium to propagate signals on the medium, the transmitter comprising:
    a bidirectional transceiver for transmitting and receiving signals, and having an input port and an output port;

a clock recovery circuit coupled between the output port and the medium, thereby to propagate signals on the medium; and a signal generator coupled to the input port of the transceiver to periodically transmit a predetermined fixed signal to the input port of the transceiver in a second direction opposite to the first direction, thereby to cause the transceiver to interpret the fixed signal as data traffic so as to allow the transceiver to transmit the data communications in the first direction.

16. The system of claim 15, wherein the signal generator comprises a serializer.

17. The system of claim 15, wherein the transmitter complies with a standard selected from the group consisting of Gigabit, Ethernet, Fast Ethernet, Sonet, Fiber channel, ISCSI, Escon, and SDH.

18. The system of claim 15, wherein the predetermined signal is a digital signal one word in length.

19. The system of claim 15, wherein the predetermined signal is a handshake signal.

20. The system of claim 17, wherein the predetermined signal is a legal signal of the selected standard.

* * * * *